July 24, 1956
R. Y. GILLOT
2,755,620
ROCKET MOTOR
Filed Feb. 7, 1952
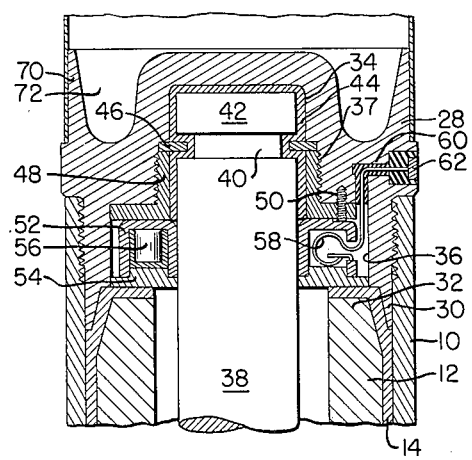
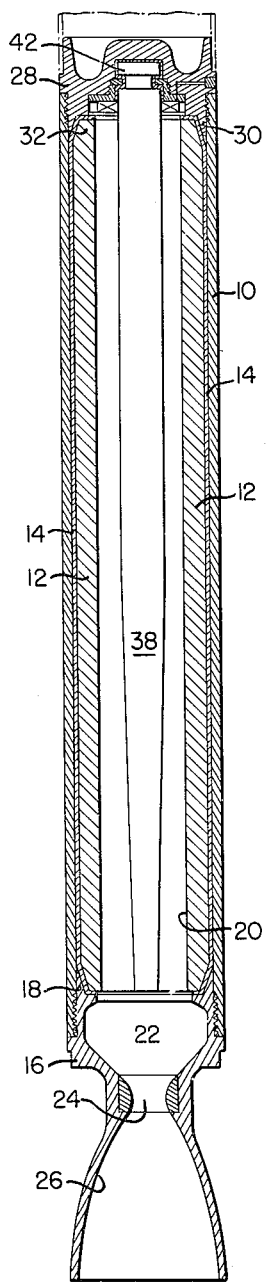
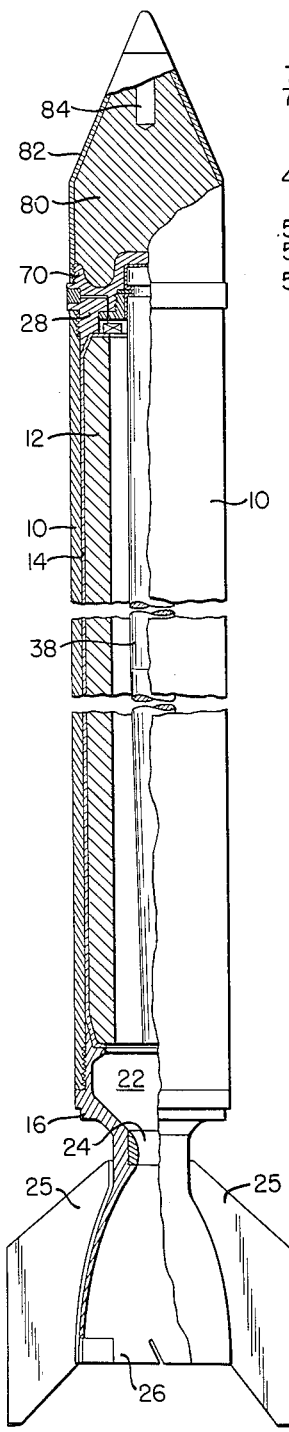
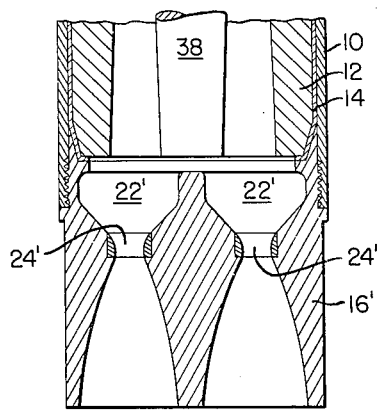
INVENTOR.
ROLAND Y. GILLOT
BY
Kenway, Jenney, Witter & Hildreth
ATTORNEYS

United States Patent Office 2,755,620
Patented July 24, 1956

2,755,620

ROCKET MOTOR

Roland Y. Gillot, Paris, France, assignor to Societe Nouvelle des Etablissements Brandt, Paris, France, a corporation of France Application February 7, 1952, Serial No. 270,425

Claims priority, application France February 8, 1951

7 Claims. (Cl. 60—35.6)

The present invention relates to self-propelled projectiles and more particularly to an improved rocket motor.

The most important object of the invention is to improve the efficiency of rocket motors.

Another object of the invention is to eliminate pressure peaks in spite of high loading density within the rocket motor at the beginning of the combustion of the propelling charge, and thereby render it safe to employ a relatively light metal casing without running the risk of rupture thereof.

Still another object of the invention is to reduce the likelihood of misfiring by minimizing disruption of the propelling charges, or grains, and consequent choking of the gas jet exhaust passages.

An important feature of the invention resides in a tubular casing provided with a tail section having jet openings, and an elongated block of propellent material rearwardly tapered at its combustion surface and secured within the casing by supporting means independent of the rear end of the block.

A feature of a preferred embodiment of the invention consists in the combination of a tubular casing lined with an annular block of propellant, and a tapered block of powder disposed concentrically within the first block and suspended from the forward end of the casing, the ends of the annular block being reduced conically to maintain a constant burning total surface of the two blocks, during the second phase of combustion when the lower section of the inner block has been reduced to a point, and the inner block consequently shortens.

An important advantage resulting from the practice of the invention is that the free space left within the casing for the flow of gases increases in cross-sectional area as the rear end is approached. Since all of the gas must be exhausted through the jet openings at the rear of the rocket motor, it follows that the flow passage must increase in cross-sectional area toward the rear of the motor if the pressure within the motor is to remain constant. However, if a tapered block were supported at its small end, as blocks are customarily mounted, the body of the block would lose support as soon as the small end burned through. However, by suspending the block from the forward end of the rocket, the smaller end may burn off without dismounting the block.

If the block became unsupported it would be extremely likely that it would choke the exit passage, and the motor would explode or extinguish. Moreover, the fact that the pressure within the casing is maintained reasonably constant during the combustion of the charge enables the use of a casing of lighter gauge material than would be feasible if pressure peaks were permitted to develop.

Finally the provision of an annular block lining the casing provides a measure of thermal insulation during the combustion period.

These and other objects and features of the invention will be more readily understood and appreciated from the following detailed description of preferred embodiments thereof selected for purposes of illustration and shown in the accompanying drawing, in which:

Fig. 1 is a view in longitudinal cross-section of a rocket motor constructed in accordance with the invention, Fig. 2 is a view in cross-section through the forward end of the rocket motor, on a larger scale, Fig. 3 is a view in cross-section through the tail of an alternative form of rocket motor, and Fig. 4 is a view in longitudinal cross-section through a rocket assembled with a motor constructed in accordance with the invention.

The rocket motor is conveniently organized within a cylindrical tubular casing 10 of relatively light gauge metal or of a plastic material having suitable characteristics. The diameter of the casing 10 and its gauge will be determined in practice by the use for which the rocket is designed, the distance it is to travel and the weight of the explosive charge it is to carry. Within the casing 10 there is disposed an annular block or cake 12 of molded or extruded propellant of a chemical nature suitable for employment as a propelling charge, that is to say, a material roughly comparable to cordite capable of being molded by plastic molding or extrusion techniques into a firm self-sustaining relatively hard body. Propelling charges of this character are sometimes referred to as "grains," but it has been deemed more explicit to refer to them herein as "blocks." Moreover, the term "propellant" is used to designate any rapidly burning substance suitable for use as the propelling charge for a projectile.

The annular block 12 of propellent material is coated on its outer surface with a layer 14 of a material which is completely effective to prevent combustion. The combustion inhibiting material 14 is preferably applied as a varnish or paint and may be of any convenient chemical compound provided its efficacy as a combustion inhibitor is satisfactory. For example, it has been found that a varnish including a substantially incombustible film-forming material such as a polyester resin makes a satisfactory inhibiting substance. In the drawing it was necessary to exaggerate the thickness of the layer 14, but in actual practice this layer would be of negligible thickness. The rear end of the tubular casing 10 is threaded to receive a tail block 16 provided at its forward end with an annular forwardly tapering flange 18 extending forwardly between the casing 10 and a conically bevelled portion 20 at the end of the annular propellent block 12. Within the tail block 16 there is a nozzle comprising chamber 22 connected to the interior of the casing 10 and provided with converging walls leading to a restricted orifice lined with an annulus 24 of graphite, refractory ceramic material, or other substance capable of withstanding the intense heat of the gases flowing through the orifice. Rearwardly of the annulus 24 the nozzle diverges outwardly as shown at 26. The configuration of the tail block forms no part of the present invention and may be varied in accordance with conventional practice; for example, in Fig. 3 there is shown a tail block 16' provided with several nozzles each having a convergent chamber 22' and a restricted orifice lined with a refractory annulus 24'. In Fig. 4 there is shown a tail block 16 to which stabilizing fins 25 have been added.

At its forward end the casing 10 is internally threaded to receive a threaded head block 28 provided with a rearwardly extending tapered annular flange 30 extending between the wall of the casing 10 and the bevelled end 32 of the annular block 12. The metal head block 28 is provided with an axial bore 34 having a pair of progressively larger counterbores 37 and 36 and it is dimensioned to receive the forward end of a long solid rod or block 38 of propellent material similar in character to that of the block 12. Adjacent its forward end the block 38 is provided with a circumferential groove 40 which forms a spaced head 42 and which receives a pair of semi-circular washers or split rings 46. The upper end of the block 38 is coated with an inhibiting substance 44 of the same material as the inhibiting layer 14 on the block 12. An annular bushing 48 has a reduced externally threaded portion engaging threads formed internally in the counterbore 37 and effective to bear against the split rings 46 and thereby hold the block 38 firmly clamped in the head block 28. Some small screws 50 (only one is shown) operate through a hole in the external flange of the bushing 48 and into the head block 28 so that the bushing, the split rings 46, the block 38 and the head block 28 are firmly held together against loosening. Behind the flange of the bushing 48 and within the counterbore 36 there is disposed an annular metal channel ring 52 having the shape of an inverted U, and the rear open end of the channel ring 52 is closed by a flanged annulus 54 of celluloid or other extremely inflammable material. Within the channel ring 52 are disposed a plurality of pellets 56 of black powder or other rapidly burning substance, while a resistance wire 58 is embedded in the pellets 56 and is connected to the ring 52 at one end and then passes through an insulating sleeve 60 to a metal contact button 62 set in the exterior surface of the head block 28. The resistance wire 58 is of such character that when current is passed through it, it rapidly becomes incandescent and thereby ignites the black powder pellets 56. As will be seen from an inspection of Fig. 2 the wire 58 may be heated by applying leads from a battery or other source of current to the button 62 and to the body of either the head block 28 or the metal casing 10, the circuit being from the button 62 through the wire 58, through the channel ring 52, the metal bushing 48, and then either through the head block 28 directly to the other lead from the source of current (not shown) or indirectly through the head block 28 and the casing 10.

The upper end of the head block 28 is provided with a forwardly extending tapered flange 70 forming an annular recess 72 for receiving the rear end of a shaped war head or explosive charge 80 suitably encased as shown at 82 and provided with a detonator 84 (Fig. 4).

From an inspection of Fig. 1 it will be noted that the center block 38 is of constant cross section from its forward end to a point about half way along the length of the casing 10, after which the block 38 exhibits a constantly decreasing cross section to its rear end. This feature is extremely important because it renders it possible to employ more propellent material in relation to the length and diameter of the casing 10, without creating undesirable pressure peaks at the beginning of the combustion of the propellent blocks. If a rocket motor were to be constructed as shown in Fig. 1 except that the center block 38 would have throughout its length the same cross section as at its forward end, the result would be that there would not be sufficient free space within the motor for the flow of the evolved gases without bringing about a sharp rise or rises in internal gas pressure. However, the provision of additional space in the rear half of the rocket, space which increases in section as the rear end is approached, results in permitting the evolved gases to escape through the tail block without incurring pressure peaks. Pressure peaks could, of course, be eliminated if the center block 38 were made throughout its length of the same cross section shown at its rear end, but while this expedient would be effective to eliminate pressure peaks, it would also eliminate a substantial quantity of propellant and thereby materially decrease the efficiency and thrust of the rocket.

When the celluloid ring 54 ignites the inner surface of the annular block 12 and the outer surface of the inner block 38, combustion spreads instantaneously throughout the length of both surfaces and the radius of the inner block 38 begins to decrease, while the radius of the inner surface of the annular block 12 begins to increase. The result is that the area of the burning surface remains constant during the operation of the rocket motor. The gases produced as the result of the combustion of the propellent blocks escape at high velocity through the tail block and thereby exert thrust which launches the rocket on its flight. A consideration of Fig. 1 shows that the amount of gas which passes through the free space in the rocket motor is greater as the tail block is approached. If the cross sectional area of the free space did not increase toward the rear of the rocket to accommodate the rearwardly increasing amount of gas, there would result an initial pressure peak which would vary considerably from one rocket to another. It would then follow that the material of the casing 10 would have to be made strong enough to withstand the peak of pressure generated at the beginning of the combustion, which would of course necessarily increase the weight of the rocket and thereby decrease the efficiency of the rocket motor.

If the rear end of the tapered center block 38 were to be supported upon a grating secured at the rear of the casing 10, there would come a time during the progress of the combustion of the propellent material when the thin rear end of the block 38 would burn through. When this occurred the block 38 would lose its support, and would almost inevitably then fall through the grate to block the exhaust passage for the gas. The net result would be either the bursting of the rocket motor or the extinguishment of its combustion. This difficulty has been overcome in accordance with the invention by suspending the block 38 from the forward end of the rocket motor and by covering its forward end with combustion inhibiting material so that the block is at all times firmly held in proper position.

Of course, the fact that the center block 38 tapers rearwardly introduces the consideration that it will burn through at its rear end before the outer annular block 12 has entirely burned through. In order therefore to maintain a constant total burning area surface, the outer block 12 is bevelled at each end, thereby introducing substantial compensation for the taper of the center block 38. For proper maintenance of a constant burning surface the annular block 12 in the embodiment described should have a thickness in the cylindrical region between the end bevels equal to the radius of the center block 38 at its forward cylindrical section, and a thickness at its end surfaces equal to the radius of the center block 38 at its rearward end. Furthermore, the cylindrical outer surface of the annular block between the bevels should have an area equal to the sum of the internal area of the annular block and the external area of the center block prior to combustion. If these conditions are provided, it will be seen that when the center block has burned to a point at its rearward end and commences to shorten, the annular block has burned to the edge of the bevel and its burning surface similarly commences to shorten, and that when the radius of the inner block has been reduced to nil the outer block is burning for an instant at its outer cylindrical surface which is of area equal to the initial total burning surface. If the ends of the annular block were not bevelled, the total burning surface, and hence the burning rate, would increase when the center block commences to shorten, for its rate of decreasing surface would be lessened while the rate of increasing burning surface on the annular block remains constant.

Moreover, the bevelling of the ends of the outer block 12 in combination with the tapered annular flanges of the head block and tail block results in another feature of the invention. In the first place the annular block is firmly locked in position by the flanges 18 and 30. Secondly the tapered flanges 18 and 30 serve as elastic lips which may yield slightly under pressure but do not break, thereby effectively preventing the escape or leakage of gas from the casing 10. That is to say the expansion of gases in the free space between the blocks of propellant will cause the flanges 18 and 30 to press against the inner wall of the casing 10 and serve as pressure responsive, leakage preventing gaskets. The result is that all of the gas evolved during combustion must leave through the jet in the tail block.

Careful tests have shown that a rocket motor constructed in accordance with the invention is at least 15% more efficient than those constructed in accordance with conventional practice. While there has been shown a preferred embodiment of rocket motor, it should be pointed out that various departures from the illustrated embodiments will suggest themselves to those skilled in the art. For example, the outer annular block 12 might be tapered rearwardly and secured with suitable means provided to maintain the block fastened to the casing even after the rear tapered part of the block has been burnt; for instance the block may be suspended to the forward end of the casing—or the block may be cemented or otherwise secured to the lateral wall of the casing. Alternatively both blocks may be so mounted and tapered if desired.

Having now described and illustrated preferred embodiments of the invention, what I claim as new and desire to secure by Letters Patent is:

1. A rocket motor comprising an elongated tubular casing, an annular block of propellant disposed in said casing, an elongated inner block of propellant disposed within and spaced from said annular block, at least one of said blocks of propellant being tapered rearwardly at its combustion surface, and securing means adapted to support the rearwardly tapered blocks independently of their rear ends.

2. Structure defined by claim 1 wherein a layer of ignition-inhibiting material is disposed on the outer surface of the annular block.

3. A rocket motor comprising a tubular casing, an annular block of propellant disposed in said casing, a layer of ignition-inhibiting material disposed on the outer surface of said annular block, an elongated inner block of propellant disposed within and spaced from said annular block, said inner block tapering rearwardly, and means secured to the forward end of said casing for engaging and holding the forward end of said inner block.

4. A rocket motor comprising a tubular casing, an annular block of propellant disposed within said casing, a layer of ignition-inhibiting material disposed on the outer surface of the annular block, an elongated tapered block of propellant disposed concentrically within the annular block and spaced therefrom, the cross-section of the tapered block decreasing toward the rear of the casing, the upper end of the tapered block having a circumferential groove, and clamping means secured to the forward end of the casing and engaging the groove in the tapered block.

5. The structure defined in claim 4 wherein a coating of combustion inhibiting material is disposed upon the extreme forward end of the tapered block.

6. A rocket motor comprising a tubular casing, an annular block of propellant disposed within said casing and bevelled to form frusto-conical ends, a tail block threaded into one end of said casing and having an annular tapered flange interposed between the inner surface of the casing and the bevelled end of the annular block, a head block threaded into the other end of the casing and having a tapered annular flange interposed between the inner surface of the casing and the bevelled end of the annular block, a coating of combustion inhibiting material completely covering the outer surface of the annular block, an elongated block of propellent material suspended from said head block concentrically within said casing and annular block and tapering rearwardly, whereby the space between the annular block and the tapered block increases in cross-section as the tail block is approached.

7. A rocket motor comprising a tubular casing, an annular block of propellant disposed within said casing and bevelled to form frusto-conical ends, a coating of combustion inhibiting material completely covering the outer surface of the annular block, an elongated block of propellent material disposed concentrically within said casing and annular block and tapering rearwardly, whereby the cross-sectional area between the annular block and the tapering block increases in the rearward direction, said annular block having a thickness between the end bevels equal to the radius at the forward end of the center block, a thickness at its end surfaces adjacent the conical surfaces of the bevel equal to the radius of the rearward end of the center block, and a cylindrical surface area between the bevels equal to the sum of the area of the inner surface of the annular block and the area of the outer surface of the center block prior to combustion.

References Cited in the file of this patent

UNITED STATES PATENTS

| | | |
|---|---|---|
| 2,043,268 | Skinner | June 9, 1936 |
| 2,419,866 | Wilson | Apr. 29, 1947 |
| 2,487,053 | Hickman | Nov. 8, 1949 |
| 2,488,154 | Africano | Nov. 15, 1949 |

FOREIGN PATENTS

| | | |
|---|---|---|
| 502,560 | France | Feb. 24, 1920 |